United States Patent
Jasklowski et al.

(10) Patent No.: US 6,733,233 B2
(45) Date of Patent: May 11, 2004

(54) ATTACHMENT OF A CERAMIC SHROUD IN A METAL HOUSING

(75) Inventors: Christophe Jasklowski, Redmond, WA (US); Gilles Carrier, Bradford, VT (US); Robert Thibeault, Longueuil (CA)

(73) Assignee: Pratt & Whitney Canada Corp., Quebec (CA)

( * ) Notice: Subject to any disclaimer, the term of this patent is extended or adjusted under 35 U.S.C. 154(b) by 0 days.

(21) Appl. No.: 10/133,286

(22) Filed: Apr. 26, 2002

(65) Prior Publication Data

US 2003/0202876 A1 Oct. 30, 2003

(51) Int. Cl.$^7$ ................................................ F01D 11/16
(52) U.S. Cl. ........................ 415/135; 415/136; 415/139; 415/173.3; 415/174.2
(58) Field of Search ................................ 415/127, 128, 415/135, 136, 173.3, 174.2, 139, 200

(56) References Cited

U.S. PATENT DOCUMENTS

| | | | |
|---|---|---|---|
| 3,146,992 A | | 9/1964 | Farrell |
| 4,008,978 A | * | 2/1977 | Smale .................... 415/134 |
| 4,087,199 A | | 5/1978 | Hemsworth et al. |
| 4,411,594 A | * | 10/1983 | Pellow et al. ............ 415/173.3 |
| 4,732,534 A | * | 3/1988 | Hanser .................... 415/136 |
| 5,181,308 A | | 1/1993 | Gray et al. |
| 5,609,469 A | | 3/1997 | Worley et al. |
| 6,048,170 A | | 4/2000 | Dodd |
| 6,113,349 A | | 9/2000 | Bagepalli et al. |

FOREIGN PATENT DOCUMENTS

| | | | |
|---|---|---|---|
| EP | 0361245 | 4/1990 | |
| FR | 2580033 A1 | * 10/1986 | ........... F01D/25/24 |
| GB | 816288 | 7/1959 | |
| JP | 09250304 | 9/1997 | |

* cited by examiner

*Primary Examiner*—Ninh H. Nguyen
(74) *Attorney, Agent, or Firm*—Bachman & LaPointe, P.C.

(57) ABSTRACT

A shroud assembly for a turbine portion of a gas turbine engine, the shroud assembly comprising an annular ceramic shroud ring, a plurality of arcuate shroud support segments, and a plurality of inwardly biased resilient members. The annular ceramic shroud ring is circumferentially disposed about radially extending blades of a turbine rotor and partially defines an annular hot gas passage of the turbine portion. The plurality of arcuate shroud support segments are radially disposed outwardly of the ceramic shroud ring and are contiguous therewith. The plurality of inwardly biased resilient members are each engaged between one of the shroud support segments and an outer annular turbine support case composed of a material having a different thermal expansion coefficient than the ceramic shroud ring. The resilient members maintain contact between the shroud support segments and the ceramic shroud ring. The shroud supporting segments and the resilient members are adapted to deflect to compensate for relative thermal growth differences between the ceramic shroud ring and the turbine support case.

15 Claims, 3 Drawing Sheets

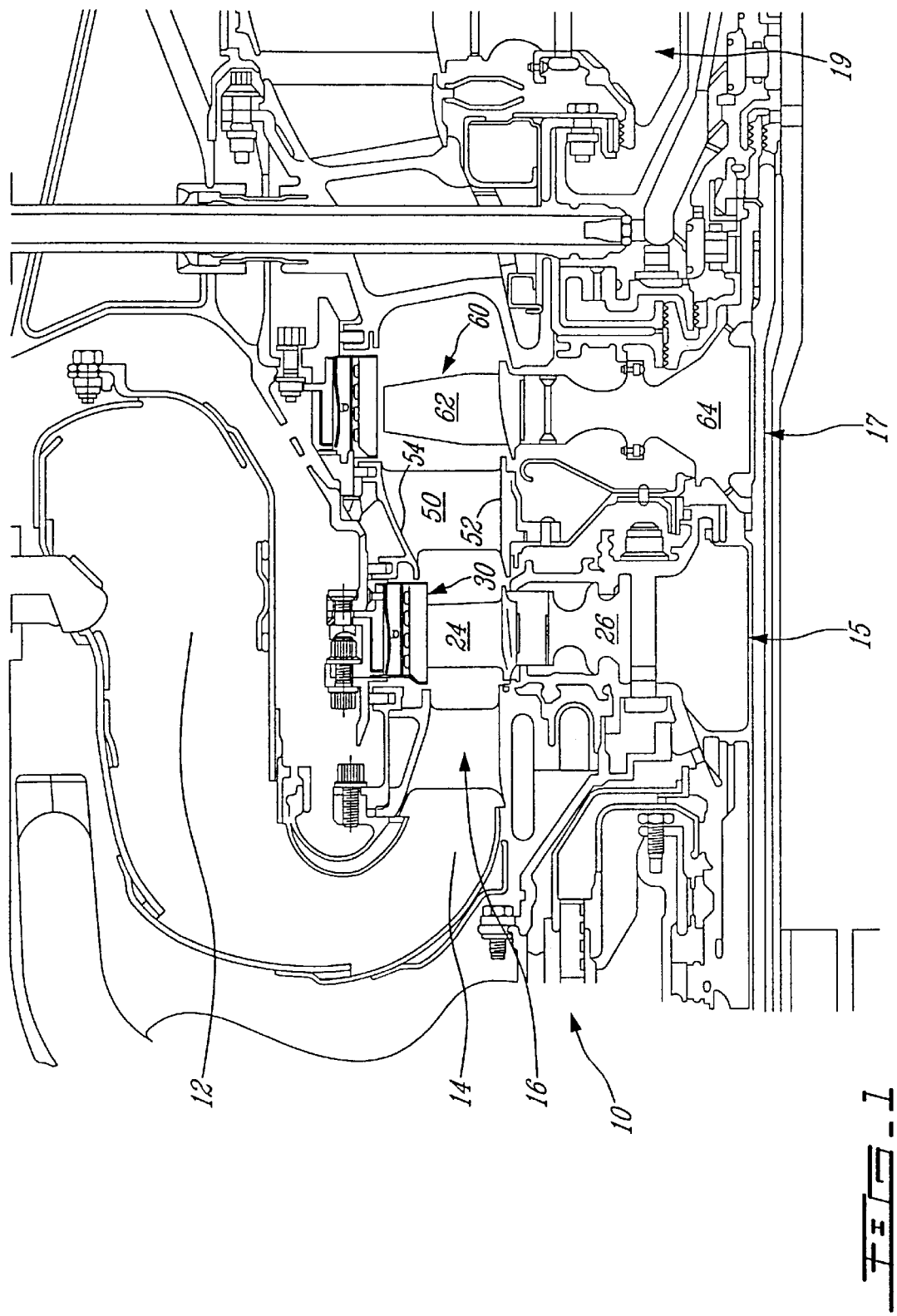

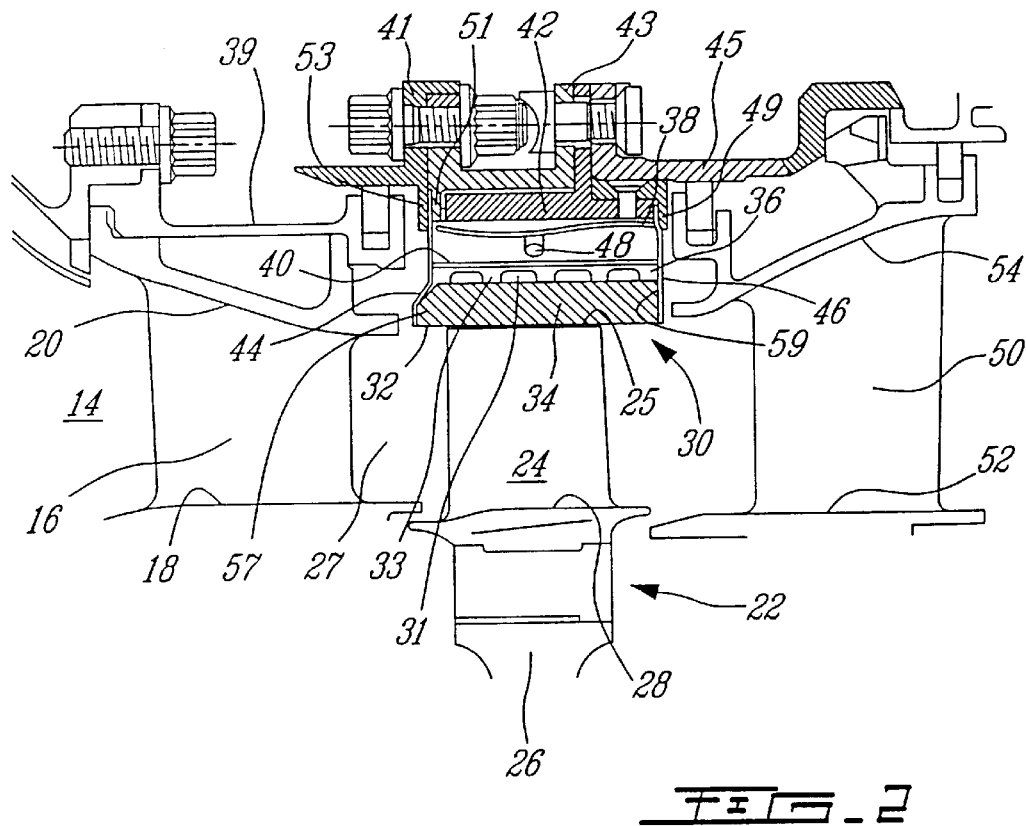
FIG_2
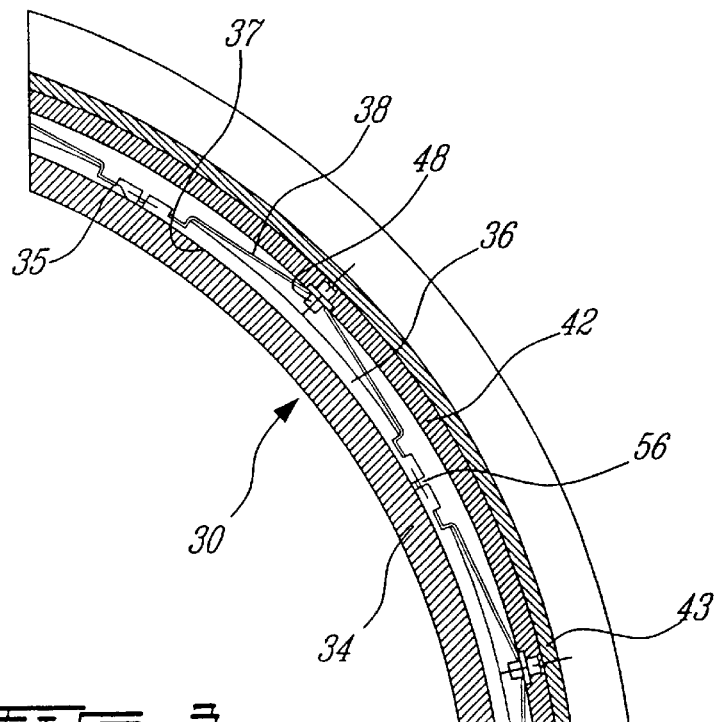
FIG_3

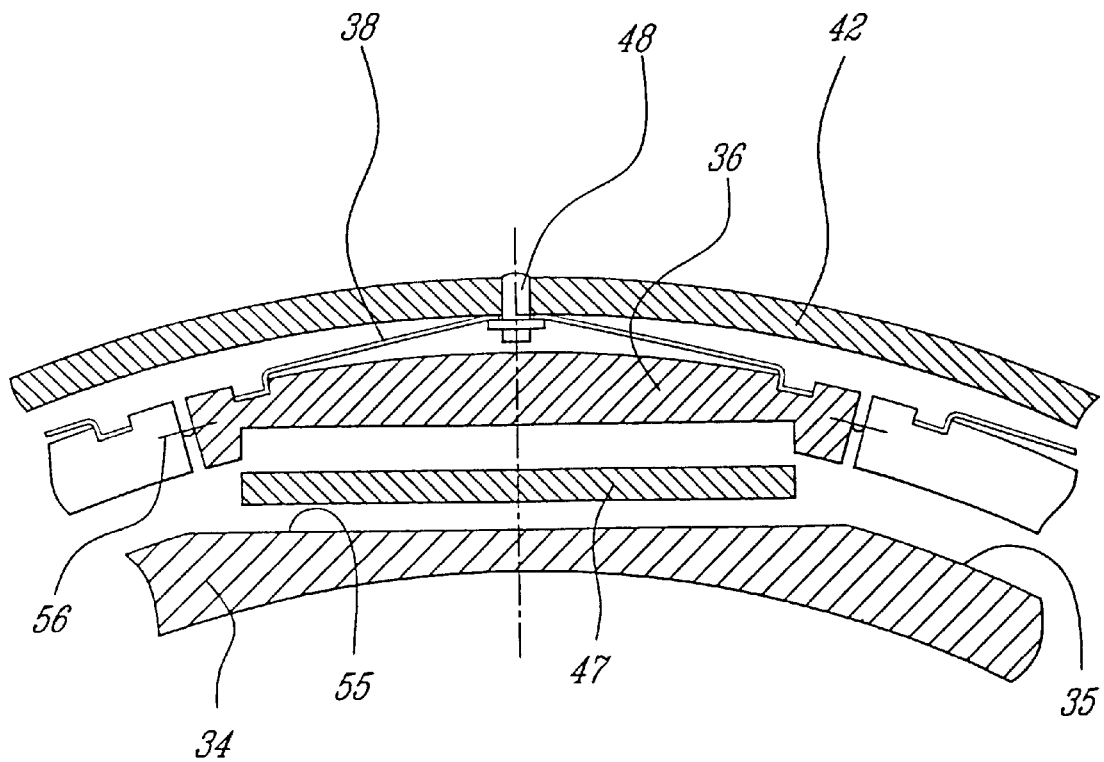
FIG_4

ATTACHMENT OF A CERAMIC SHROUD IN A METAL HOUSING

FIELD OF THE INVENTION

The present invention relates to gas turbine engines, and more particularly, to an improved turbine shroud assembly.

BACKGROUND OF THE INVENTION

Gas turbine aircraft engines comprising a compressor portion, a combustion chamber and an axial turbine portion are well known. The heat generated during combustion, however, nevertheless presents challenges when designing structural elements that are to be exposed to the high combustion temperatures, such as the elements of the turbine portion of the engine, where temperatures can easily reach 2000° F. The task of designing components capable of withstanding such elevated temperatures is made additionally difficult by the need to keep weight to a minimum. Weight reduction of gas turbine engines used for aircraft applications is becoming increasingly important, and as such weight considerations remain a critical design focus for new gas turbine engine components.

Two main approaches have been taken to meet these requirements for turbine components. The first comprises using various fluid cooling systems, often using air as the cooling fluid, to reduce the peak temperatures of the metal turbine structure, without requiring a reduction in turbine inlet temperatures which would negatively affect overall engine performance. The problem with this approach is that the cooling air is extracted from air that could otherwise be used for the propulsion cycle, thereby reducing the engine performance. The higher the turbine inlet temperature, the more cooling air is required to maintain the turbine components at acceptable temperatures, and therefore the more air is required to be extracted from the working air.

The second approach taken to deal with high turbine operating temperatures is to use components made of materials capable of withstanding higher temperatures with little or no fluid cooling required. As such, ceramics have become more and more utilized for their ability to effectively withstand high temperatures without negative affects on its material strength. Ceramic as a material is additionally attractive for use in aircraft applications, because of its relatively low weight in comparison to traditionally used metals and metal alloys.

However, certain characteristics of ceramic materials prevent direct replacement of metal alloy turbine components with ceramic components. Ceramic materials are generally much more brittle and have lower tensile strength than most metals. A major obstacle restricting the use of ceramic components in high temperature regions of gas turbine engines is the considerable difference in thermal expansion of ceramic materials in comparison to metals or metal alloys. The thermal expansion coefficients of ceramic materials are only a small fraction of those of conventionally used nickel alloy materials, for example. This presents considerable difficulties when a ceramic element and a metal alloy element are interfaced.

Some attempts have been made to solve this thermal growth mismatch problem when using ceramic turbine components in gas turbine engines. U.S. Pat. No. 4,087,199, issued May 2, 1978 to Hemsworth et al., for example, discloses a ceramic turbine shroud assembly comprising a plurality of ceramic blocks which are arranged in a ring around the tips of the rotating turbine blades. Each ceramic block is provided with a pair of dovetail surfaces formed on opposite sides of the block which function as wedging surfaces. Metallic clamping means in the form of a pair of annular spring-like members, hold the blocks in the assembly and produce a preloaded radial force against the dovetail surfaces. This preloaded clamping of the blocks against the rigid stops establishes the shroud in the proper radial position, but does not permit the shroud to be resiliently, eccentrically displaced.

U.S. Pat. No. 3,146,992, issued to Farrell Sep. 1, 1964, also discloses a turbine shroud support structure. Farrell does not teach the use of a ceramic shroud, but provides a sprung shroud designed to maintain clearances between the turbine blade tips and the shroud. The turbine shroud support structure comprises bimetallic thermal support strips which are provided for maintaining the desired clearances between a circumferentially extending segmented shroud ring and the tips of a row of turbine blades. The bimetallic support strips are supported by their ends in the space between the segmented shroud ring and casing, each strip positioned with its layer having the lowest coefficient of expansion adjacent the casing. The unsupported center of each bimetallic support strip is connected to a respective shroud ring segment. With increasing operating temperature, the bimetallic strips deflect to move the shroud inwardly relative to the exterior casing. With decreasing operating temperatures, they deflect to move the shroud outwardly relative to the casing.

Both of these references, however, disclose segmented turbine shrouds. Segmented shrouds are less efficient for sealing purposes in comparison with continuous shroud rings, and permit more hot gas leakage between the shroud segments. Additionally, segmented rings create greater difficulty in setting turbine blade tip clearances, exact shroud diameter and roundness.

SUMMARY OF THE INVENTION

It is an object of the present invention to provide an improved turbine shroud assembly.

It is another object of the present invention to provide a ceramic turbine shroud ring and a mounting method thereof.

It is yet another object of the present invention to provide an attachment for a ceramic turbine shroud in a metal housing such that the thermal expansion difference between the shroud ring and the support housing is compensated.

Therefore, in accordance with one the present invention, there is provided a shroud assembly for a turbine portion of a gas turbine engine, the shroud assembly comprising: an annular ceramic shroud ring, circumferentially disposed about radially extending blades of a turbine rotor and partially defining an annular hot gas passage of said turbine portion; a plurality of arcuate shroud support segments, radially disposed outwardly of said ceramic shroud ring and contiguous therewith; a plurality of inwardly biased resilient members, each engaged between one of said shroud support segments and an outer annular turbine support case composed of a material having a different thermal expansion coefficient than said ceramic shroud ring, said resilient members maintaining contact between said shroud support segments and said ceramic shroud ring; and said shroud supporting segments and said resilient members being adapted to deflect to compensate for relative thermal growth differences between said ceramic shroud ring and said turbine support case.

In accordance with a second aspect of the present invention, a ceramic shroud assembly is provided for a gas turbine engine turbine portion comprising a turbine rotor having radially extending turbine blades, the ceramic shroud assembly comprising: a continuously uninterrupted ceramic shroud ring, circumferentially disposed about said turbine blades and partially defining an annular hot gas passage of said turbine portion; whereby said continuously uninterrupted ceramic shroud ring minimizes hot gas leakage from tips of said turbine blades.

In accordance with a third aspect of the present invention, a shroud assembly is provided for a turbine portion of a gas turbine engine, the shroud assembly comprising: a turbine shroud, circumferentially disposed about radially extending blades of a turbine rotor and partially defining an annular hot gas passage of said turbine portion; a plurality of arcuate shroud support segments, radially disposed outwardly of said turbine shroud and contiguous therewith; a plurality of inwardly biased leaf springs, each engaged between one of said shroud support segments and an outer annular turbine support case, said leaf springs maintaining contact between said shroud support segments and said turbine shroud; said turbine shroud and said outer annular turbine support case being composed of materials having different thermal expansion coefficients; whereby said shroud supporting segments and said leaf springs being adapted to deflect to compensate for relative thermal growth differences between said turbine shroud and said turbine support case.

BRIEF DESCRIPTION OF THE DRAWINGS

Further features and advantages of the present invention will become apparent from the following detailed description, taken in combination with the appended drawings, in which:

FIG. 1 shows a partial axial cross-sectional view of the combustion chamber and turbine section of a gas turbine engine having a ceramic turbine shroud assembly according to the present invention.

FIG. 2 is an enlarged fragmentary axial cross-sectional view showing a detailed view of the ceramic turbine shroud assembly of FIG. 1.

FIG. 3 shows a quarter view radial cross-section of an isolated ceramic turbine shroud assembly according to the present invention.

FIG. 4 shows a fragmentary radial cross-section, partially exploded view of a portion of the ceramic turbine shroud assembly of FIG. 3.

DETAILED DESCRIPTION OF THE PREFERRED EMBODIMENT

Referring first to FIG. 1, a portion of a gas generator section 10 of a gas turbine engine comprises generally a combustion chamber 12 and at least a first compressor turbine stage 15. In the example shown, the gas generator portion 10 additionally comprises a second compressor turbine stage 17 and a first power turbine stage 19. The first and second compressor turbine stages are used to drive the compressor sections of the gas turbine engine, and the power turbine portion 19 is generally used to provide power output from the engine. The description of the turbine shroud assembly 30 of the present invention will generally be done with respect to the first compressor turbine stage 15, where temperatures are the highest. However, one skilled in the art will understand that the turbine shroud assembly of the present invention can equally be located within any turbine stage of the gas turbine engine, if this proves to be advantageous.

In the example as shown having first and second compressor turbine stages, hot gases from the combustion chamber 12 enter the first, or high pressure, turbine stage 15 through the turbine inlet region 14 which is followed immediately downstream by a plurality of stationary first compressor turbine stage inlet nozzle vanes 16 which direct the flow passing between the inner stator flow path guide 18 and the outer stator flow path guide 20. The high pressure (HP) turbine 22, located immediately downstream of the HP nozzle vanes, or stators, 16, comprises generally turbine rotor disk 26 having a plurality of rotor blade airfoils 24 radially extending therefrom. As is well known in the prior art, the rotor blades are engaged to the turbine disk by fir-tree shaped bases, which allow room for thermal blade expansion while firmly attaching the blades to the disk. Flow through the annular HP turbine duct portion 27 is radially restricted by the inner rotor flow path guide 28 of the rotor blade base portions, and by the outer flow guide surface 32 of the turbine shroud assembly 30.

The second, or low pressure (LP), compressor turbine stage 17 is located downstream of the HP turbine stage and comprises generally a second annular row of stationary LP stator vanes 50 and the LP turbine 60, comprising central disk 64 and radially extending airfoils 62. Flow through this annular LP hot gas passage is directed between the inner LP stator flow path guide 52 and the outer LP stator flow path guide 54, and then subsequently between the base of the LP turbine airfoil blades 62 and the LP turbine shroud assembly. Flow then continues downstream through the annular hot gas passage to the power turbine stage 19. The turbine shroud assembly 30 of the present invention will be described in further detail only in terms of the turbine shroud of the HP turbine stage 15, however each turbine stage of the engine may or may not have a similar ceramic turbine shroud.

Referring to FIGS. 2 and 3, the ceramic turbine shroud assembly 30 generally includes a continuous uninterrupted annular ceramic shroud member 34 supported by a plurality of arcuate shroud support segments 36 which are engaged within the annular outer turbine support case 42 via a plurality of leaf springs 38. In the preferred embodiment, twelve shroud support segments 36, each sprung by a leaf spring 38, permit the continuous annular ceramic shroud ring 34 to be compliantly disposed about the blade tips 25 of the radially extending turbine blades 24. Feather seals 56 are located circumferentially between each adjacent arcuate shroud support segment 36. The plurality of leaf springs 38, the plurality of shroud support segments 36 and the plurality of feather seals 56, are all adapted to absorb any thermal growth mismatch between the metal outer turbine support casing 42 and the ceramic turbine shroud 34.

In an alternate embodiment, the turbine shroud can be a non-ceramic metallic alloy, for example, having a different thermal expansion coefficient than the outer turbine support casing. It will be apparent to one skilled in the art that the turbine shroud assembly of the present invention is adapted to absorb thermal growth mismatch between a turbine shroud and an outer turbine support casing composed of materials having different thermal expansion coefficients.

The absorption of the difference in thermal expansion between the ceramic shroud and the support casing, permits the ceramic shroud ring 34 to be a continuous annular ring, rather than being composed of a plurality of split individual segments. The feather seals 56 between adjacent shroud support segments 36 which retain the shroud ring, prevent heat stress concentration in the ceramic shroud by ensuring even circumferential distribution.

The continuous annular ceramic shroud ring 34 improves the sealing about the turbine blade tips, thereby minimizing the hot gas tip leakages while improving the cooling air system behind the shroud ring. Additionally, a continuous shroud ring improves the turbine blade tip clearance settings, providing a better control of the shroud diameter and roundness.

The arcuate shroud support segments 36 are not fixed directly to the ceramic shroud 34, but the plurality of shroud support segments 36, each biased by a leaf spring 38, engage the ceramic shroud ring to support it in a neutral position concentric with the turbine rotor, and only exert inward radial force on the ceramic shroud 34 when the shroud is eccentrically displaced. This enables the ceramic shroud to be compliantly supported within the outer turbine support case 42. This, accordingly, permits any difference in thermal expansion of the shroud member 34 and the outer turbine support case 42 to be taken up by the leaf springs 38, the shroud support segments 36, and the feather seals 56, therefore eliminating any interface problems that can otherwise result at high temperature. The arcuate shroud support segments 36 preferably do not contact the outer radial surface of the shroud 34 along their full inner surface, but do so along radially inwardly projecting ridges 33 formed by grooves 31 in the inner curved surface of the shroud support segments 36. This reduces the surface contact area between the ceramic shroud ring 34 and the shroud support segments 36, thereby reducing the heat transfer by conduction from the shroud ring to the outer components, and improving the convection cooling of the outer surface of the shroud ring.

Axial displacement prevention and vibration dampening for the ceramic shroud 34 is provided by upstream and downstream friction retaining plates 44 and 46 respectively. The plates 44 and 46 are generally disposed in parallel planes perpendicular to a longitudinal centerline axis of the engine. The retaining plates engage the upstream and downstream annular faces 57 and 59 of the ceramic shroud ring, thereby preventing any axial movement of the shroud ring.

As the ceramic shroud member 34 is not rigidly fixed to the outer turbine support case 42 and is, in effect, resiliently floating about the turbine rotor, some control of the maximum permissible eccentric displacement of the ceramic shroud ring is required, in order to prevent excessive blade tip rubbing. As such, a plurality of pins, inwardly projecting from the turbine support casing 42, act as stops for the ceramic shroud via the shroud support segments 36 in order to prevent the turbine blade tips from rubbing with the shroud as a result of an excessive eccentric shroud movement. The displacement control pins 48, preferably one for each shroud support segment 36, therefore control and limit the maximum radial displacement of the shroud support segments which retain the ceramic shroud ring, by abutting the shroud support segments 36 when the ceramic ring assembly moves eccentrically too far from its neutral operating position concentric with said turbine rotor.

While the ceramic ring 34 is not fixed directly to the shroud support segments 36, the shroud is prevented from rotating within the supporting segments by anti-rotation plates 47, shown in FIG. 4, engaged within shroud support segments specially machined to receive the anti-rotation plates. The locking, anti-rotation plates 47 can be installed during assembly of the ceramic shroud, or at the end of the assembly once the ceramic ring is aligned and in place. The outer radial surface 35 of the ceramic shroud ring 34 comprises corresponding flat surfaces 55 formed thereon, and adapted to accept the anti-rotation plates. The flattened surfaces 55 thereby prevent the ceramic shroud ring from rotating within the supporting segments. Preferably, three circumferentially equally spaced shroud support segments with anti-rotation plates 47 mate with three corresponding flat surfaces 55 on the ceramic ring 34, the anti-rotation plates being substantially 120 degrees apart. The anti-rotation plates 47 are axially positioned by the front and rear retaining plates 44 and 46. The use of flat plates results in reduced stress concentration within the anti-rotation plates.

The springs 38, being leaf springs or any other equivalent biasing members, are preferably engaged with the shroud support segments on the radial outer surface 40 at opposing ends of the support segments. The mid point of each leaf spring 38 is fixed to the outer support case 42 at the same location as the inwardly projecting pins 48. The leaf springs could equivalently be inverted, such that they engage the shroud support segments at their center and fix to the outer casing at the opposing ends of the leaf spring, however this alternate arrangement may lead to less even movement of a sprung shroud support segment 36 when acted upon by an eccentrically displacing shroud ring 34.

Turbine blade tip rub is significantly reduced by using a continuous ceramic shroud ring which has better diameter and roundness control in comparison with segmented turbine shrouds of the prior art. As the continuous ceramic shroud ring has a fixed diameter, interchangeable ceramic shroud rings having different diameters can be selected as appropriate and interchanged, to correspond to the turbine rotor assembly diameter, should it change over the life span of the parts due to blade tip rubbing or repair processes. The displaceable nature of the present turbine shroud assembly also permits the ceramic shroud ring to be repositioned to accommodate any eccentric displacement of the turbine wheel with respect to the shroud ring over time.

In the present example, the turbine support case 42 is retained in the gas turbine engine between an outer turbine support case downstream housing 43 and the LP turbine stator support housing 45. A plurality of threaded fasteners are used to retain the turbine support case 42 within the outer case housings. The downstream shroud retaining plate 46 is engaged between the turbine support case 42 and a downstream inwardly projecting flange 49 of the outer turbine support case housing 43. The corresponding upstream shroud retaining plate 44 is fixed between opposing inwardly projecting upstream flanges 51 and 53 of the turbine support case housing 43 and the turbine support case 42 respectively.

The embodiments of the invention described above are intended to be exemplary only. For example, while the turbine shroud assembly of the present invention has been described with respect to the first stage compressor turbine, it can equally be disposed at any turbine stage of the engine. Additionally, while the preferred embodiment discloses the use of a ceramic turbine shroud because of the known advantages associated with ceramic components in high temperature environments, the present compliant attachment method could be used for a non-ceramic turbine shroud ring, for example made of a metallic alloy, having a different coefficient of thermal expansion than that of the outer turbine support casing. While in the preferred embodiment of the present invention the ceramic shroud is a continuous ring, it is nevertheless envisioned to use a turbine shroud, ceramic or otherwise, that is a split ring or that is comprised of several individual circumferentially contiguous arcuate turbine shroud segments, and is nevertheless resiliently biased as described herein to permit the absorption of any thermal growth mismatch that may occur. The scope of the invention is therefore intended to be limited solely by the scope of the appended claims.

What is claimed is:

1. A shroud assembly for a turbine portion of a gas turbine engine, the shroud assembly comprising:
   an annular ceramic shroud ring, circumferentially disposed about radially extending blades of a turbine rotor and partially defining an annular hot gas passage of said turbine portion;
   a plurality of arcuate shroud support segments, radially disposed outwardly of said ceramic shroud ring and contiguous therewith;
   a plurality of inwardly biased resilient members, each engaged between one of said shroud support segments and an outer annular turbine support case composed of a material having a different thermal expansion coefficient than said ceramic shroud ring, said resilient members maintaining contact between said shroud support segments and said ceramic shroud ring; and
   said shroud supporting segments and said resilient members being adapted to deflect to compensate for relative thermal growth differences between said ceramic shroud ring and said turbine support case.

2. The shroud assembly as defined in claim 1, wherein radially extending pins, inwardly protruding from said turbine support case, limit the radial displacement of said shroud support segments engaged with said ceramic shroud ring, when said shroud supporting segments abut said pins.

3. The shroud assembly as defined in claim 1, wherein said shroud support segments are circumferentially separated by feather seals.

4. The shroud assembly as defined in claim 3, wherein said feather seals are additionally adapted to deflect to compensate for relatively different thermal growth between said ceramic shroud ring and said turbine support case.

5. The shroud assembly as defined in claim 1, wherein an anti-rotation plate prevents said ceramic shroud ring from rotating within said plurality of shroud support segments.

6. The shroud assembly as defined in claim 1, wherein said ceramic shroud ring is axially positioned by upstream and downstream friction retaining plates.

7. The shroud assembly as defined in claim 6, wherein said friction retaining plates additionally provide vibration dampening for said ceramic shroud ring.

8. The shroud assembly as defined in claim 1, wherein the resilient members are leaf springs extending between one of said shroud support segments and the outer annular turbine support case.

9. A ceramic shroud assembly for a gas turbine engine turbine portion comprising a turbine rotor having radially extending turbine blades, the ceramic shroud assembly comprising:
   a continuously uninterrupted ceramic shroud ring, circumferentially disposed about said turbine blades and partially defining an annular hot gas passage of said turbine portion, whereby said continuously uninterrupted ceramic shroud ring minimizes hot gas leakage from tips of said turbine blades,
   and wherein said ceramic shroud ring is supported within an outer turbine support case by a plurality of inwardly biasing members engaged between said outer turbine support case and arcuate shroud support segments contiguous with an outer surface of said ceramic shroud ring, whereby said biasing members are adapted to at least partially deflect to compensate for relative thermal expansion difference between said ceramic shroud ring and said outer turbine support casing.

10. The ceramic shroud assembly as defined in claim 9, wherein said biasing members comprise leaf springs adapted to deflect to absorb the thermal expansion difference between said ceramic shroud ring and said outer turbine support casing.

11. The ceramic shroud assembly as defined in claim 9, wherein said arcuate shroud support segments are circumferentially separated by feather seals, and said arcuate shroud support segments and said feather seals additionally partially deflect to compensate for relative thermal expansion differences between said ceramic shroud ring and said outer turbine support casing.

12. The ceramic shroud assembly as defined in claim 9, wherein radially extending pins, inwardly projecting from said outer turbine support case such that said pins abut said shroud support segments to limit radial displacement of said shroud support segments when said ceramic shroud ring is eccentrically displaced.

13. A shroud assembly for a turbine portion of a gas turbine engine, the shroud assembly comprising:
   a turbine shroud, circumferentially disposed about radially extending blades of a turbine rotor and partially defining an annular hot gas passage of said turbine portion;
   a plurality of arcuate shroud support segments, radially disposed outwardly of said turbine shroud and contiguous therewith;
   a plurality of inwardly biased leaf springs, each engaged between one of said shroud support segments and an outer annular turbine support case, said leaf springs maintaining contact between said shroud support segments and said turbine shroud;
   said turbine shroud and said outer annular turbine support case being composed of materials having different thermal expansion coefficients;
   whereby said shroud supporting segments and said leaf springs being adapted to deflect to compensate for relative thermal growth differences between said turbine shroud and said turbine support case.

14. The shroud assembly as defined in claim 13, wherein said arcuate shroud support segments are circumferentially separated by feather seals, and said feather seals additionally partially deflect to compensate for relative thermal expansion differences between said turbine shroud and said outer turbine support casing.

15. The shroud assembly as defined in claim 13, wherein radially extending pins, inwardly projecting from said outer turbine support case such that said pins abut said shroud support segments to limit radial displacement of said shroud support segments when said turbine shroud is eccentrically displaced.

* * * * *